United States Patent [19]

Schmidhuber et al.

[11] Patent Number: 4,966,409
[45] Date of Patent: Oct. 30, 1990

[54] SHIELD FOR COVERING THE GAP BETWEEN THE SLIDING COVER AND THE ROOF FRAME OF A SLIDING ROOF OR SLIDING LIFTING ROOF OF A MOTOR VEHICLE

[75] Inventors: Karl Schmidhuber, Alzenau; Rainer Grimm, Wetzlar; Horst Böhm, Frankfurt am Main, all of Fed. Rep. of Germany

[73] Assignee: Rockwell-Golde G.m.b.H., Fed. Rep. of Germany

[21] Appl. No.: 380,943

[22] Filed: Jul. 17, 1989

[30] Foreign Application Priority Data

Jul. 29, 1988 [DE] Fed. Rep. of Germany ....... 3825838

[51] Int. Cl.$^5$ ............................ B60J 7/05; B60J 7/22; B60R 13/07
[52] U.S. Cl. .................................... 296/213; 296/217; 296/221
[58] Field of Search ................ 296/213, 217, 221, 222

[56] References Cited

U.S. PATENT DOCUMENTS

| | | | |
|---|---|---|---|
| 3,894,767 | 7/1975 | Schatzler | 296/213 |
| 4,089,557 | 5/1978 | Leiter | 296/221 |
| 4,537,442 | 8/1985 | Jardin | 296/221 |
| 4,709,959 | 12/1987 | Paerisch et al. | 296/217 |
| 4,798,410 | 1/1989 | Weller et al. | 296/217 |

FOREIGN PATENT DOCUMENTS 1230683 12/1966 Fed. Rep. of Germany ...... 296/222

Primary Examiner—Dennis H. Pedder

[57] ABSTRACT

A multipart, telescopic shield for covering the lateral gap between the underside of a rigid sliding cover with which it is displaceable and the roof frame of a roof of a motor vehicle. The sliding cover has front and rear guide shoes which are guided on rails arranged laterally on the roof frame. In addition, the sliding cover has a water deflector which is displaceable therewith to underpin the rear edge gap between the cover and the fixed vehicle roof. The water deflector is also guided along the guide rail by guide shoes. The water deflector is connected to the cover by arms which are constructed as a shield.

7 Claims, 5 Drawing Sheets

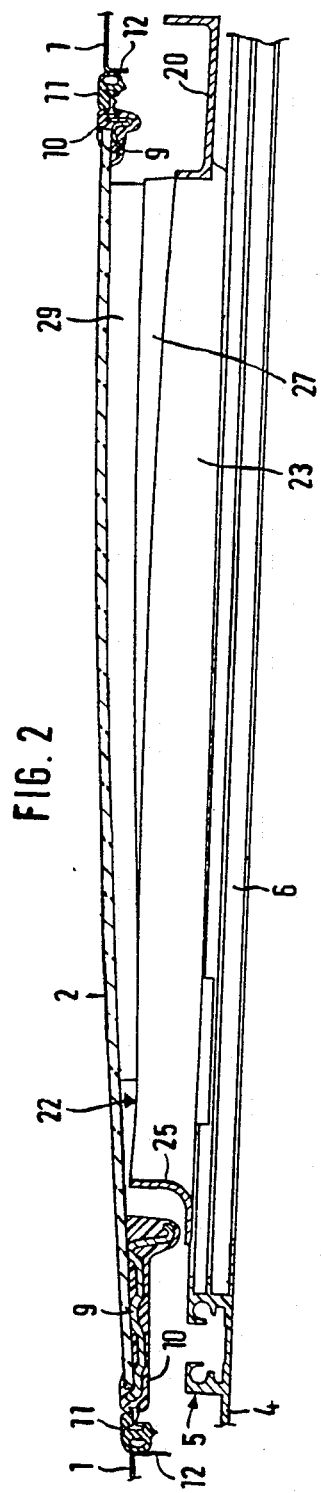
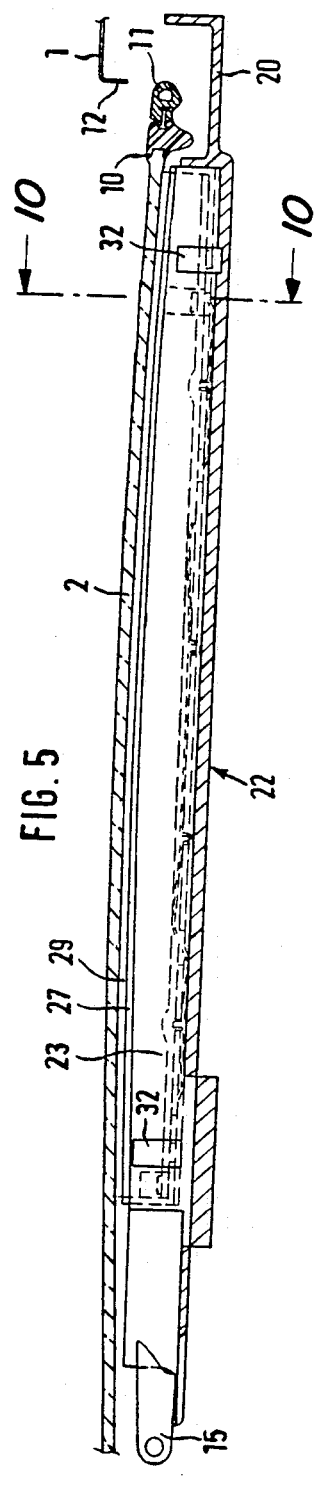

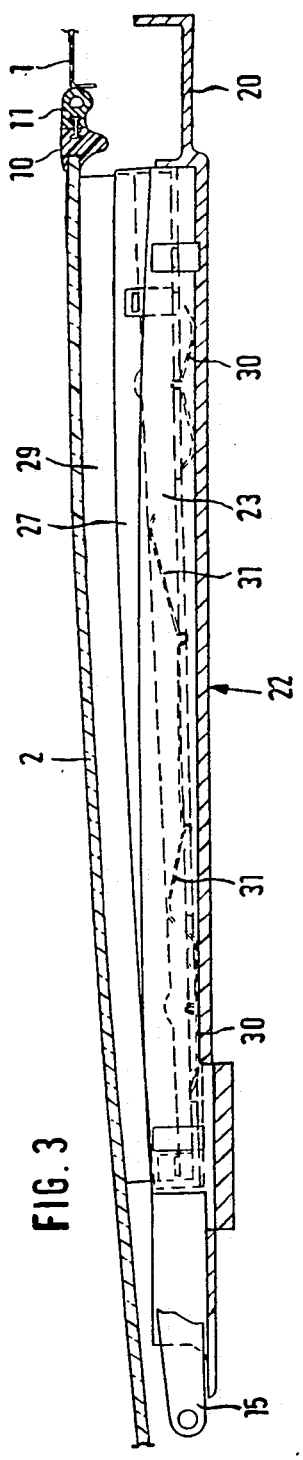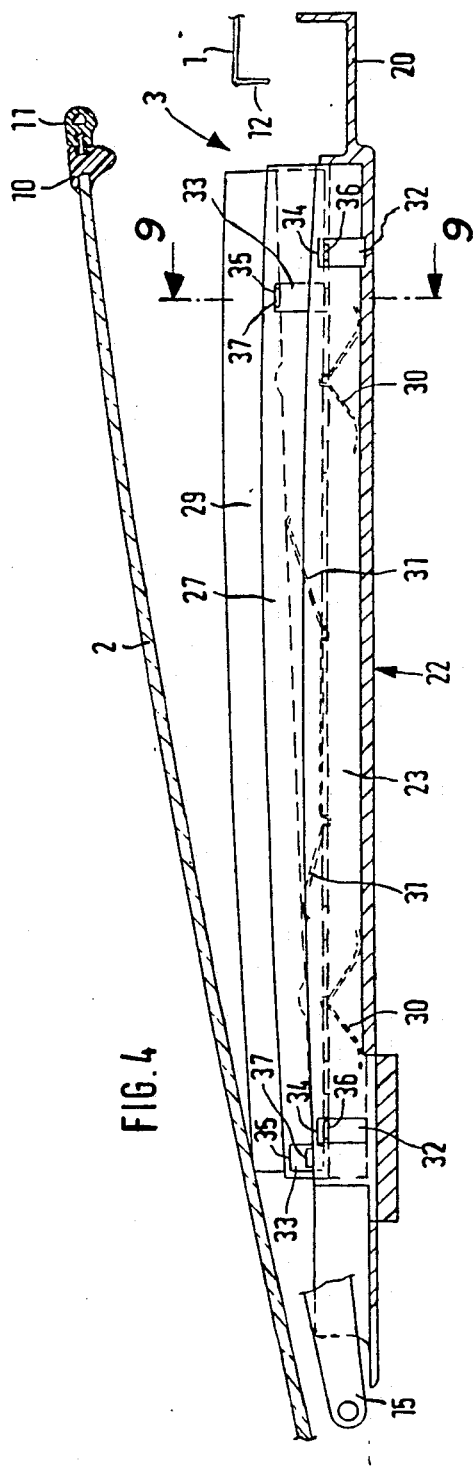

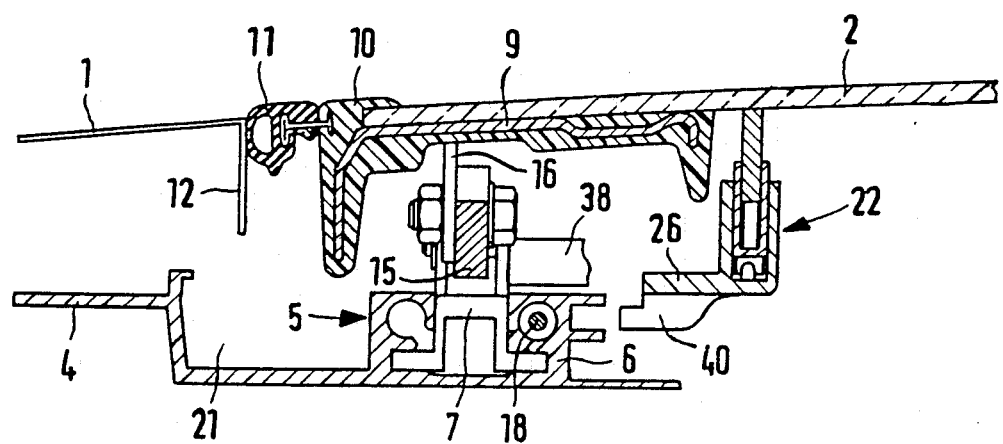
FIG. 6
FIG. 7
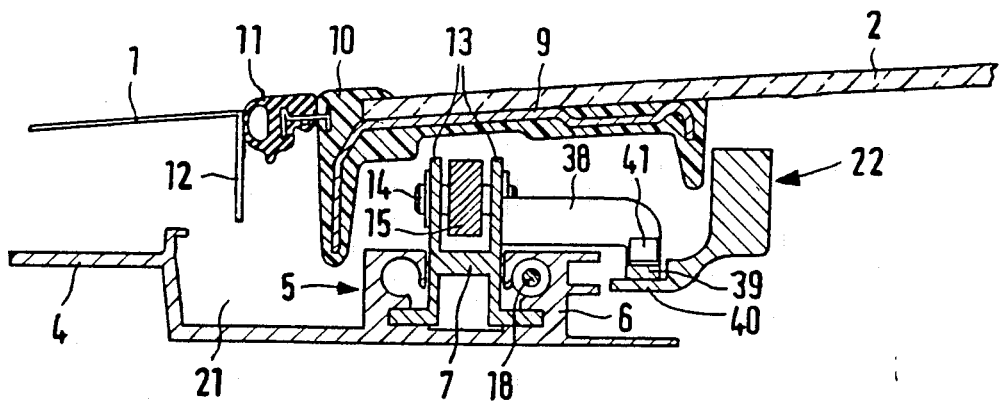

SHIELD FOR COVERING THE GAP BETWEEN THE SLIDING COVER AND THE ROOF FRAME OF A SLIDING ROOF OR SLIDING LIFTING ROOF OF A MOTOR VEHICLE

BACKGROUND OF THE INVENTION

This invention relates to a multipart, telescopable shield for covering the lateral gap between the underside of a rigid and preferably transparent sliding cover, with which it is displaceable, and the roof frame of a sliding roof or sliding lifting roof of a motor vehicle.

Such shields have the function of concealing the working parts necessary for the movement control of the sliding cover and which can otherwise be seen from the vehicle interior to a greater or lesser extent in the gap between the roof frame and the sliding cover as a function of the position of the latter, so as to give a harmonious overall impression of the cover facing and roof top surface.

Such a known shield (German Patent No. 28 27 889) is constructed in two-part form on each cover side and comprises an upper shield part detachably fitted to the sliding cover and a lower shield part fitted to the frame and detachably engaging therewith and which is displaceably guided on a covering of the frame. The two shield parts are basically constructed in strip-like manner and for improving the accessibility of the adjusting means for the sliding cover can be fitted following the height adjustment. Due to the sliding guidance of the lower shield part, considerable frictional forces can occur during cover displacements, which can make it difficult to operate the sliding roof, particularly if the lower shield part is also used for guiding a cover top displaceable independently of the sliding cover. Moreover, although the known shield is constructed for use with sliding roofs, it is not intended for use with sliding lifting roofs.

SUMMARY OF THE INVENTION

An object of the present invention is to provide a shield in which for the displacement of the shield together with the sliding cover, there is no need to overcome additional frictional forces and which is usable both for sliding and sliding lifting roofs.

According to the present invention, there is provided a multipart, telescopable shield for covering the lateral gap between the underside of a rigid, preferably transparent, sliding cover with which it is displaceable and the roof frame of a sliding or sliding lifting roof of a motor vehicle, the sliding cover with front and rear guide shoes being guided on guide rails arranged laterally on the roof frame and a rear edge gap between the cover and the fixed vehicle roof being underpinned by a water deflector displaceable with the sliding cover, the water deflector being guided by additional guide shoes on the guide rails and being connected by connecting arms constructed as a shield to the front guide shoes, with all of the parts of the shield only being provided on the connecting arms.

According to the basic principle of the present invention no part of the shield is directly fitted to the sliding cover and the shield is not in direct frictional guidance engagement with the roof frame or any other component fixed to the roof. Thus, there are no additional frictional forces on moving the shield. The construction of the connecting arms which are in any case present with a water deflector displaceably guided on guide rails as a multipart, telescopable shield ensures that the latter requires no additional sliding guidance elements. As a result of the connection of the connecting arms to the front guide shoes, substantially the entire length of the connecting arms can be used for forming the shield, so that comparatively speaking the shield has a considerable length.

Preferably, the connecting arms in each case comprise a lower part having an elongate and upwardly open cavity and at least one lamellar strip movably engaging in the cavity with resilient means provided between the lower part and said at least one lamellar strip and between each lamellar strip where more than one is provided. The resilient means acts to displace the lamellar strip or strips in the direction of the sliding cover. Through this arrangement, the lamellar shield is spread apart in fan-like manner to the extent permitted by the pivoting or opening position of the sliding cover. The pivoting movements of the sliding cover engaging with the shield from below consequently control the shape of the shield closing the gap. The arrangement can be such that the upper lamellar strip engages with the entire length or only the front portion of the maximum opened sliding cover.

It is advantageous for the assembly of the shield if the telescopable parts of the connecting arms are associated with stops limiting the upwardly directed displacement path. This ensures that the individual telescopable parts of the shield cannot fall apart. The fitting of stops for limiting the relative movement path between the individual parts of the shield makes it possible to obtain a desired maximum spreading or expansion of the shield, which need not or need not completely coincide with the vertical gap dimensions when the sliding cover is completely open.

The connecting arms can be connected by locking elements to the front guide shoes and this leads to a particularly favourable fitting of the connecting arms on the front guide shoes. This fitting makes it possible for the lateral working parts of the roof structure always to remain accessible without significant assembly expenditure, e.g. also for subsequent adjustments of the cover height. For this purpose, it is merely necessary to release the locking connections and to move the connecting arms rearwards together with the water deflector connected thereto.

Preferably, the lamellar strip which engages in the cavity of the lower part of the connecting arms has itself an elongate, upwardly open cavity in which engages a further lamellar strip and the lower part of the lamellar strips are guided on engaging sidewalls. In this way, the shield can be built up from, for example, three telescopable parts and in cross-section the arrangement is similar to a multiple telescopic arrangement. This construction also permits the concealed housing of the resilient means which can be in the form of springs arranged in the cavities.

The front ends of the connecting arms are preferably interconnected by a front shield strip, because this simultaneously makes it possible to cover the front gap between the sliding cover and the roof frame.

The shield is preferably constructed as a one-part, rigid frame which permits a particularly easy handling during assembly and also facilitates manufacture, particularly if all of the parts of the rigid frame are, for example, shaped in one piece from a suitable plastics material.

Preferably, the springs are leaf springs which permit a space-saving arrangement without loose parts having to be inserted between the shied components.

To achieve a readily accessible locking connection of the shield with the associated front guide shoe, the front guide shoes can in each case be provided with a lateral projection on which is arranged part of the locking elements.

BRIEF DESCRIPTION OF THE DRAWINGS

For a better understanding of the invention and to show how the same may be carried into effect, reference will now be made, by way of example, to the accompanying drawings, in which:

FIG. 2 is a section taken along line II—II of FIG. 1, but with the sliding cover shown in its closed position, FIG. 3 is a section taken along line III—III in FIG. 1, but with the sliding cover in the closed position, FIG. 4 is a section taken along line III—III in FIG. 1 with the sliding cover in its maximum open position, FIG. 5 is a section taken along III—III in FIG. 1 with the sliding cover lowered for movement, FIG. 6 is a section taken along line VI—VI in FIG. 1, FIG. 7 is a section taken along line VII—VII in FIG. 1.

DESCRIPTION OF PREFERRED EMBODIMENTS

Figure 1:
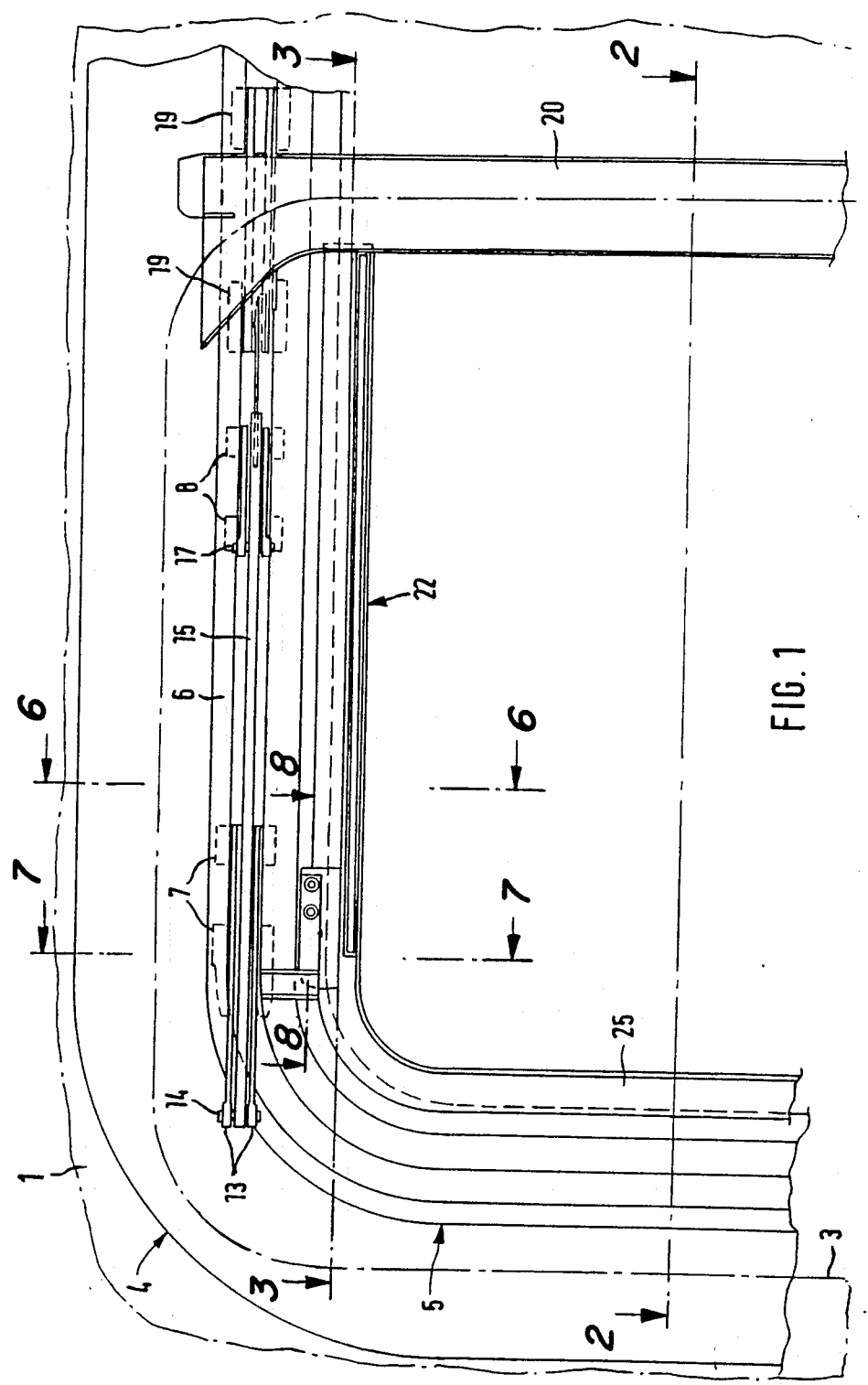
FIG. 1 is a broken away plan view of a roof frame of a sliding roof or sliding lifting roof for a motor vehicle, the roof frame being shown with working parts fitted thereto, but without a sliding cover.

FIG. 1 shows a fixed vehicle roof 1 in dot-dash line form. In the front area of the fixed vehicle roof 1 is provided a roof opening 3 indicated by dot-dash lines and which can be closed by a sliding cover 2 (FIG. 2). Below the fixed vehicle roof 1 is fixed a roof frame 4 surrounding the roof opening 3 on three sides and which in the represented example is constructed in one piece with a continuously constantly profiled guide frame 5. On a lateral guide rail 6 of the guide frame 5, the sliding cover 2 is displaceably guided with a front guide shoe 7 and a rear guide shoe 8 on each side of the homologously constructed roof structure shown only with the right-hand side in FIG. 1.

In the embodiment shown, the rigid sliding cover 2 is a transparent glass cover, which is fixed on a frame-like sliding cover reinforcement 9, which is not shown in FIGS. 3 to 5 for drawing simplification purposes. The sliding cover reinforcement 9 and the outer edge of the sliding cover 2 are embedded in an all-round enclosing frame 10, to whose outer circumference is fixed an edge gap seal 11, which seals the sliding cover 2 with respect to a folded-over edge 12 passing all around the roof opening 3 with the cover in the closed position.

The front guide shoe 7 has a forwardly directed, fork-like swivel bearing projection 13 (FIGS. 1 and 7), which is articulated by means of a bearing bolt 14 to a guide link rod 15. At at least two remote points, the rod 15 is vertically adjustably fixed by a clip 16 fitted to the sliding cover reinforcement 9 and whereof one is visible in FIG. 6. The bearing bolt 14 forms the front swivel bearing of the sliding cover 2 and therefore a horizontal axis at right angles to the sliding direction and about which the sliding cover 2 is pivotably mounted.

In the rear region of the guide link rod 15 is provided a link slot (not shown), in which engages a guide pin 17 (FIG. 1), which is fixed to the rear guide shoe 8. On the latter engages a compressively rigid drive cable 18 (FIGS. 6 and 7) displaceably guided in the guide frame 5 and which is in driving connection with a crank drive means or an electric motor (neither are shown) for its longitudinal displacement. The driving cable 18 brings about both sliding movements and pivoting or opening movements of the sliding cover 2. In the case of pivoting and opening movements the guide pin 17 moves in the link slot, whose shape and dimensions, together with the displacement of the rear guide shoe 8 on the guide rail 6, determine the direction and extent of the pivoting movement of the sliding cover 2 about the bearing bolt 14.

As can be gathered from FIG. 1, in the vicinity of the rear edge of roof opening 3, an additional guide shoe arrangement 19 is displaceably mounted on the guide rail 6 and which, as a result of the homologous nature of the arrangement, has a counterpart on the opposite side of the sliding cover 2. These additional guide shoe arrangements 19 are firmly interconnected by a water guide element or deflector 20 and displaceably guide the latter on the two lateral guide rails 6 of the guide frame 5. The water deflector 20 basically has the cross-sectional shape of an upwardly open U-profile and underpins the rear marginal gap, which is formed between the rear edge of the sliding cover 2 and the rear edge of the roof opening 3. The water deflector 20 is laterally open and, for removing the water, ends above a water draining channel 21 (FIGS. 6 and 7) shaped into the roof frame 4. The water deflector 20 participates in the sliding movements of the sliding cover 2 and for this purpose is connected on either side of the roof opening 3 by means of in each case one connecting arm 22 to the associated, front guide shoe 7 in a manner to be described hereinafter.

Each connecting arm 22 has a lower part 23, which is provided with an elongate, upwardly open cavity 24. In the present embodiment, the lower part 23 of the connecting arms 22, the water deflector 20 and a front shield strip 25 are constructed as a one-part, rigid frame. The front shield strip 25 connects the front ends of the connecting arms 22 and has an L-shaped cross-section (FIG. 2).

Figure 9:
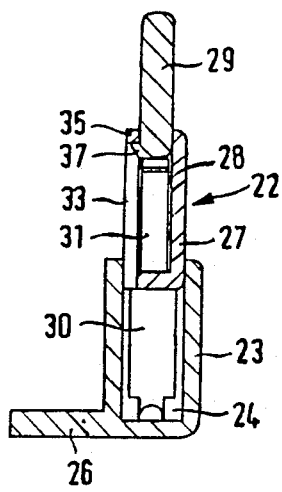
FIG. 9 is a section taken along line IX—IX in FIG. 4 with the maximum spreading or expansion of the shield.
Figure 10:
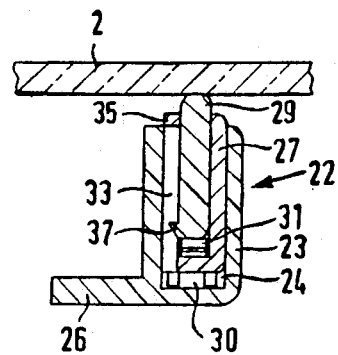
FIG. 10 is a section taken along line X—X in FIG. 5 with maximum compression or contraction of the shield.

For the further explanation of the connecting arms 22 constructed as a shield, reference will now be made to FIGS. 2 to 5 and 9 and 10. The lower part 23 is also cross-sectionally approximately L-shaped, the vertical leg of the L-profile comprising two parallel, spaced side walls, which form the cavity 24 between them. The horizontal leg 26 of the profile forming the lower part 23 projects outwards when viewed from the roof opening 3 and overlaps the inner edge of the roof frame 4, as shown in FIGS. 6 and 7. A central lamellar strip 27 movably engages in the elongate cavity 24 and also has an elongate, upwardly open cavity 28, in which an upper lamellar strip 29 movably engages. The lower part 23, central lamellar strip 27 and upper lamellar strip 29 are telescopable, as illustrated in FIGS. 9 and 10 and form a shield whose vertical dimensions can be modified. The cavities 24 and 28, whose side walls guide the central lamellar strip 27 or the upper lamellar strip 29, contain springs 30 and 31 constructed as leaf springs and which tend to displace the lamellar strips 27 and 29 into the position shown in FIG. 9. In the central region, the springs 30 are fixed at the bottom to the central lamellar strip 27 and engage with their free ends on the bottom of the cavity 24 in the lower part 23. The one-part spring 31 is also fixed at the bottom to the central lamellar strip 27 and engages with its free ends on the underside of the upper lamellar strip 29, as can best be seen in FIG. 4.

As is illustrated by FIG. 4 in conjunction with FIGS. 9 and 10, in both a side wall of the lower part 23 and a side wall of the central lamellar strip 27 at the front and rear are in each case provided vertically directed slots 32, 33, whereof only the rear slot 33 in the central lamellar strip 27 can be seen in the cross-sections of FIGS. 9 and 10. Slots 32, 33 do not pass over the full height of the particular side wall and instead terminate upstream of its upper edge, so as to leave behind the stop webs 34, 35. Stop noses 36 fitted to the bottom of the central lamellar strip 27 engage in the slots 32, whilst stop noses 37 fitted to the bottom of the upper lamellar strip 29 engage in slots 33. It is clear that the stop webs 34, 35 and stop noses 36, 37 form stop pairs, which bound the upwardly directed displacement path of the lamellar strips 27 and 29.

In the embodiment illustrated the lower part, the lamellar strips 27 and 29 and the stop pairs are so constructed and provided that a shield is formed which, in the closed position of the sliding cover 2 (FIGS. 2 and 3), with the upper lamellar strip 29, engages over its full length with the underside of the sliding cover 2. When the sliding cover 2 is open (FIG. 4), the upper lamellar strip 29 still engages with its front end against the underside of the sliding cover 2. A wedge-shaped lateral gap is left on either side of the sliding cover above the shield. The arrangement can obviously also be such that the upper lamellar strip 29 also engages over its entire length with the underside of the completely open sliding cover 2.

Figure 8:
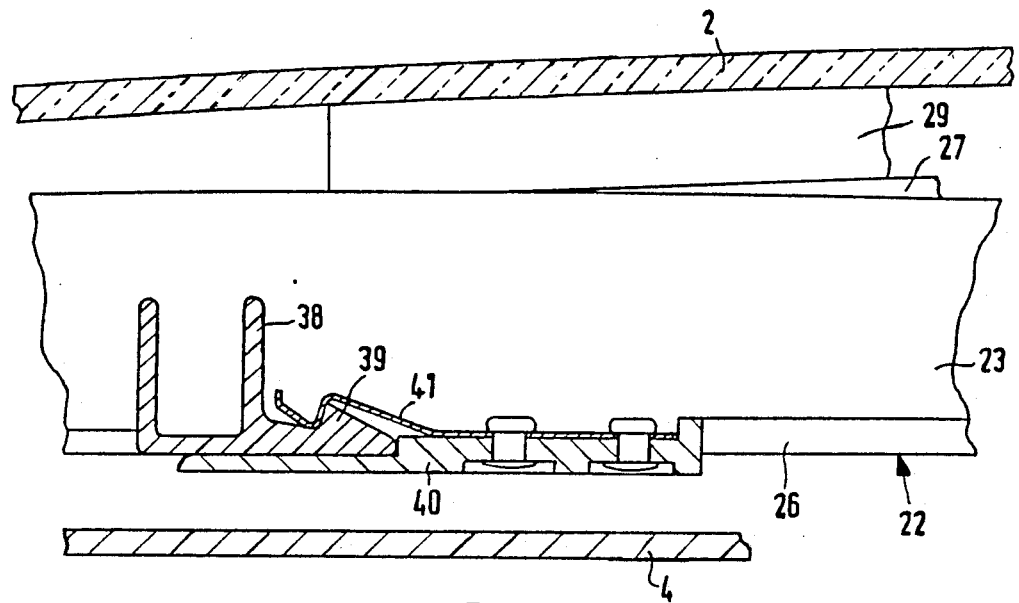
FIG. 8 is a section taken along line VIII—VIII in FIG. 1.

For assembly and maintenance reasons the connecting arms 22 are detachably connected to the front guide shoes 7. For this purpose the front guide shoes 7 are in each case provided with a lateral projection 38 on which is located a detent 39 (FIG. 8). In the vicinity of the detent 39, the projection 38 rests with its lower face on a support projection 40, which is connected to the horizontal leg 26 of the lower part 23. A locking spring 41 engaging with the detent 39 is fixed to the support projection 34.

During the first assembly, the one-part, rigid frame formed from the lower parts 23 of the connecting arms 22, the water deflector 20 and the front shield strip 25, together with the guide shoe means 19 arranged thereon, is inserted in the corresponding guide channels of the rearwardly open guide rail 6 and moved forwards until the locking springs 41 with the detents 39 engage with the front guide shoes 7. If, for maintenance reasons, e.g. for height correction purposes, the cover fastening elements or movement mechanism have to be made accessible, the described rigid frame is moved back opposite to its locking direction. The cover movement elements are then easily accessible from the interior of the vehicle with the sliding cover 2 open or closed. This displacement of the rigid frame is possible, because the latter is not connected to the sliding cover 2 either in the vicinity of the lateral shield, or with its front shield strip 25.

The slots 32 and 33 in the lower part 23 and/or the central lamellar strip 27 cannot be seen from the inside of the vehicle, because they face the edge 12 of the fixed vehicle roof 1. From the inside of the vehicle the shield has a completely smooth surface and is only subdivided by parts 23, 27 and 29, as can be seen in FIG. 2. If the sliding cover 2 is pivoted from the open position shown in FIG. 4 back into the closed position shown in FIG. 3, or, starting from the closed position in FIG. 3, the sliding cover 2 is pivoted into the lower position shown in FIG. 5, then the sliding cover 2 in each case compresses the shield against its resilient bias, so that the central lamellar strip 27 is introduced into the cavity 24 of the lower part 23 and the upper lamellar strip 29 into the cavity 28 of the central lamellar strip 27.

We claim:

1. A multipart telescopable shield for covering the lateral gap between the underside of a rigid sliding cover with which it is displaceable and the roof frame of a roof of a motor vehicle, the sliding cover having front and rear guide shoes which are guided on guide rails arranged laterally on the roof frame comprising; a water deflector displaceable with the sliding cover, the water deflector being guided by additional guide shoes on guide rails and being connected by connecting arms constructed as a shield to the front guide shoes;

wherein the connecting arms comprises a lower part having an elongate and upwardly open cavity and at least one lamellar strip moveably engaging in the cavity, and resilient means being provided between the lower part and said at least one lamellar strip, the resilient means acting to displace the lamellar strip toward the sliding cover.

2. A shield according to claim 1, wherein the connecting arms are associated with stops limiting the lamellar strip displacement.

3. A shield according to claim 1, wherein the lamellar strip which engages the cavity of said lower part has itself an elongate, upwardly open cavity, in which engages a further said lamellar strip and the lamellar strips being guided by engaging sidewalls.

4. A shield according to claim 1, wherein said resilient means are springs arranged in said cavities.

5. A shield according to claim 4, wherein the springs are leaf springs.

6. A shield according to claim 1, wherein the front ends of the connecting arms are interconnected by a front shield strip.

7. A shield according to claim 6, wherein the lower parts of the connecting arms, the water deflector and the front shield strip are constructed as a one-part, rigid frame.

* * * * *